(12) United States Patent
Chen et al.

(10) Patent No.: US 12,488,604 B2
(45) Date of Patent: Dec. 2, 2025

(54) EXAMINATION SYSTEM AND EXAMINATION METHOD THEREOF

(71) Applicants: DELTA ELECTRONICS, INC., Taoyuan (TW); NATIONAL CHENG KUNG UNIVERSITY, Tainan (TW)

(72) Inventors: Chih-Yang Chen, Taoyuan (TW); Pau-Choo Chung Chan, Tainan (TW); Sheng-Hao Tseng, Tainan (TW)

(73) Assignees: DELTA ELECTRONICS, INC., Taoyuan (TW); NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 18/404,746

(22) Filed: Jan. 4, 2024

(65) Prior Publication Data

US 2024/0144708 A1  May 2, 2024

Related U.S. Application Data

(62) Division of application No. 15/998,500, filed on Aug. 16, 2018, now abandoned.

(30) Foreign Application Priority Data

Aug. 16, 2017 (TW) .................. 106127758

(51) Int. Cl.
*G06V 30/142* (2022.01)
*A61B 5/00* (2006.01)
(Continued)

(52) U.S. Cl.
CPC .......... *G06V 30/142* (2022.01); *A61B 5/0013* (2013.01); *A61B 5/0071* (2013.01);
(Continued)

(58) Field of Classification Search
CPC ... A61B 5/0013; A61B 5/0071; A61B 5/0088; A61B 5/7264; A61B 2576/02;
(Continued)

(56) References Cited

U.S. PATENT DOCUMENTS

2001/0021271 A1  9/2001 Ishibashi
2002/0034330 A1  3/2002 Lennon et al.
(Continued)

FOREIGN PATENT DOCUMENTS

CN       1516074 A    7/2004
CN     106419809 A    2/2017
(Continued)

OTHER PUBLICATIONS

Office Action and Search Report dated Mar. 19, 2018 issued in corresponding Taiwan Application No. 106127758, 10 pages.
(Continued)

*Primary Examiner* — Chao Sheng
(74) *Attorney, Agent, or Firm* — MUNCY, GEISSLER, OLDS & LOWE, P.C.

(57) ABSTRACT

An examination system is provided. The examination system includes an optical detector and analyzer. The optical detector emits a detection light source toward a target object and detects a respondent light which is induced from the target object in response to the detection light source to generate image data. The image data indicates a detection image. The analyzer receives the image data and determines which region of the target object the detection image belongs to according to the image data. When the analyzer determines that the detection image belongs to a specific region of the target object, the analyzer extracts at least one feature of the image data to serve as a basis for classification of the specific region.

16 Claims, 10 Drawing Sheets

(51) Int. Cl.
*G06F 18/2433* (2023.01)
*G06T 7/00* (2017.01)
*G06T 7/11* (2017.01)
*G06V 10/25* (2022.01)
*G06V 10/54* (2022.01)
*G06V 10/72* (2022.01)
*G16H 50/20* (2018.01)

(52) U.S. Cl.
CPC .......... *A61B 5/0088* (2013.01); *A61B 5/7264* (2013.01); *G06F 18/2433* (2023.01); *G06T 7/0012* (2013.01); *G06T 7/11* (2017.01); *G06V 10/25* (2022.01); *G06V 10/54* (2022.01); *G06V 10/72* (2022.01); *G16H 50/20* (2018.01); *A61B 2576/02* (2013.01); *G06F 2218/08* (2023.01); *G06F 2218/12* (2023.01); *G06T 2207/10064* (2013.01); *G06T 2207/10152* (2013.01); *G06T 2207/30036* (2013.01); *G06T 2207/30088* (2013.01); *G06T 2207/30096* (2013.01); *G06V 2201/03* (2022.01); *G06V 2201/07* (2022.01); *G06V 2201/10* (2022.01)

(58) Field of Classification Search
CPC ...... G06V 30/142; G06V 10/25; G06V 10/54; G06V 10/72; G06V 2201/03; G06V 2201/07; G06V 2201/10; G06T 7/11; G06T 7/0012; G06T 2207/10064; G06T 2207/10152; G06T 2207/30036; G06T 2207/30088; G06T 2207/30096; G16H 50/20; G06F 18/2433; G06F 2218/12; G06F 2218/08

See application file for complete search history.

(56) References Cited

U.S. PATENT DOCUMENTS

| | | | |
|---|---|---|---|
| 2005/0244794 A1 | 11/2005 | Kemp et al. | |
| 2008/0039720 A1* | 2/2008 | Balas | G01N 33/57407 600/431 |
| 2010/0036260 A1* | 2/2010 | Zuluaga | A61B 1/0684 600/249 |
| 2019/0384047 A1 | 12/2019 | Johnson et al. | |

FOREIGN PATENT DOCUMENTS

| | | | | |
|---|---|---|---|---|
| JP | 2006006968 A | * | 1/2006 | ............... A61B 1/24 |
| TW | 201706706 A | | 2/2017 | |

OTHER PUBLICATIONS

Office Action dated Jan. 11, 2021 issued in corresponding China Application No. 201710702092.1, 10 pages.

English machine translation of JP 2006006968, Clarivate Analytics, accessed on Aug. 1, 2022.

* cited by examiner

EXAMINATION SYSTEM AND EXAMINATION METHOD THEREOF

CROSS REFERENCE TO RELATED APPLICATIONS

This application is a Divisional of pending U.S. patent application Ser. No. 15/998,500, filed Aug. 16, 2018 and entitled "EXAMINATION SYSTEM AND EXAMINATION METHOD THEREOF", which claims priority of Taiwan Application No. 106127758, filed on Aug. 16, 2017, the entirety of which is incorporated by reference herein.

BACKGROUND OF THE INVENTION

Field of the Invention

The invention relates to an examination system and an examination method thereof, and more particularly to an examination system and an examination method for fluorescent images

Description of the Related Art

At present, common examination methods for the oral cancer include visual inspection or palpation by a doctor and pathological section examination. It is mainly for doctors to visually inspect or palpate the oral mucosa to observe whether there are precancerous lesions or precancerous signs on the oral mucosa, such as leukoplakia, erythema, oral submucous fibrosis, etc., thereby determining whether the oral cancer arises. However, the personal experience of the doctor or visual environment (such as light intensity) will affect the results that are determined. In addition, in the early stage of the oral cancer, there is no obvious sign on the surface of the oral cavity, which may easily lead the doctor to making the wrong determination.

The pathological slice examination is an invasive examination. The process of taking oral tissues not only causes a psychological burden on the patient, but also causes wounds which may further cause potential complications. In addition, pathological section examination takes a long time. The sampling and processing of the tissues and analysis results made by the pathologists may vary from person to person, resulting in errors in the examination. Therefore, it can be known that the current oral cancer examination lacks an effective and reliable criterion for determination.

BRIEF SUMMARY OF THE INVENTION

The invention provides an examination method for determining a region where an image is located on a target object through a captured image and performing an examination according to a specific determination manner of the corresponding region.

An exemplary embodiment of an examination system is provided. The examination system comprises an optical detector and analyzer. The optical detector emits a detection light source toward a target object and detects a respondent light which is induced from the target object in response to the detection light source to generate image data. The image data indicates a detection image. The analyzer receives the image data and determines which region of the target object the detection image belongs to according to the image data. When the analyzer determines that the detection image belongs to a specific region of the target object, the analyzer extracts at least one feature of the image data to serve as a basis for classification of the specific region.

An exemplary embodiment of an examination method is provided. The examination method comprises the following steps of emitting a detection light source toward a target object; generating image according to a respondent light which is induced from the target object in response to the detection light source, wherein the image data indicates a detection image; determining which region of the target object the detection image belongs to according to the image data; extracting at least one feature of the image data in response to determining that the detection image belongs to a specific region of the target object; and taking the at least one feature of the image data as a basis for classification of the specific region.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
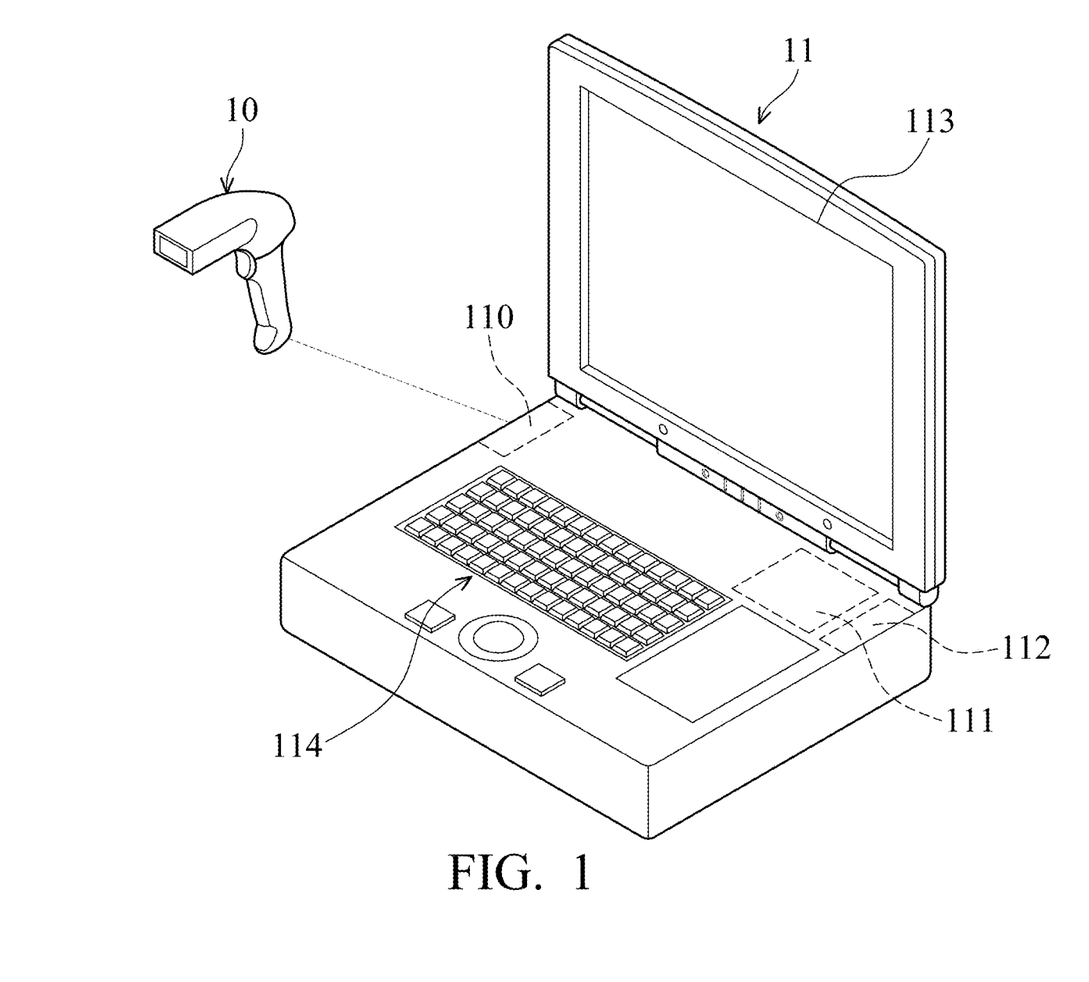
FIG. 1 is a schematic diagram showing appearance of an examination system according to one exemplary embodiment of the present invention.
Figure 2:
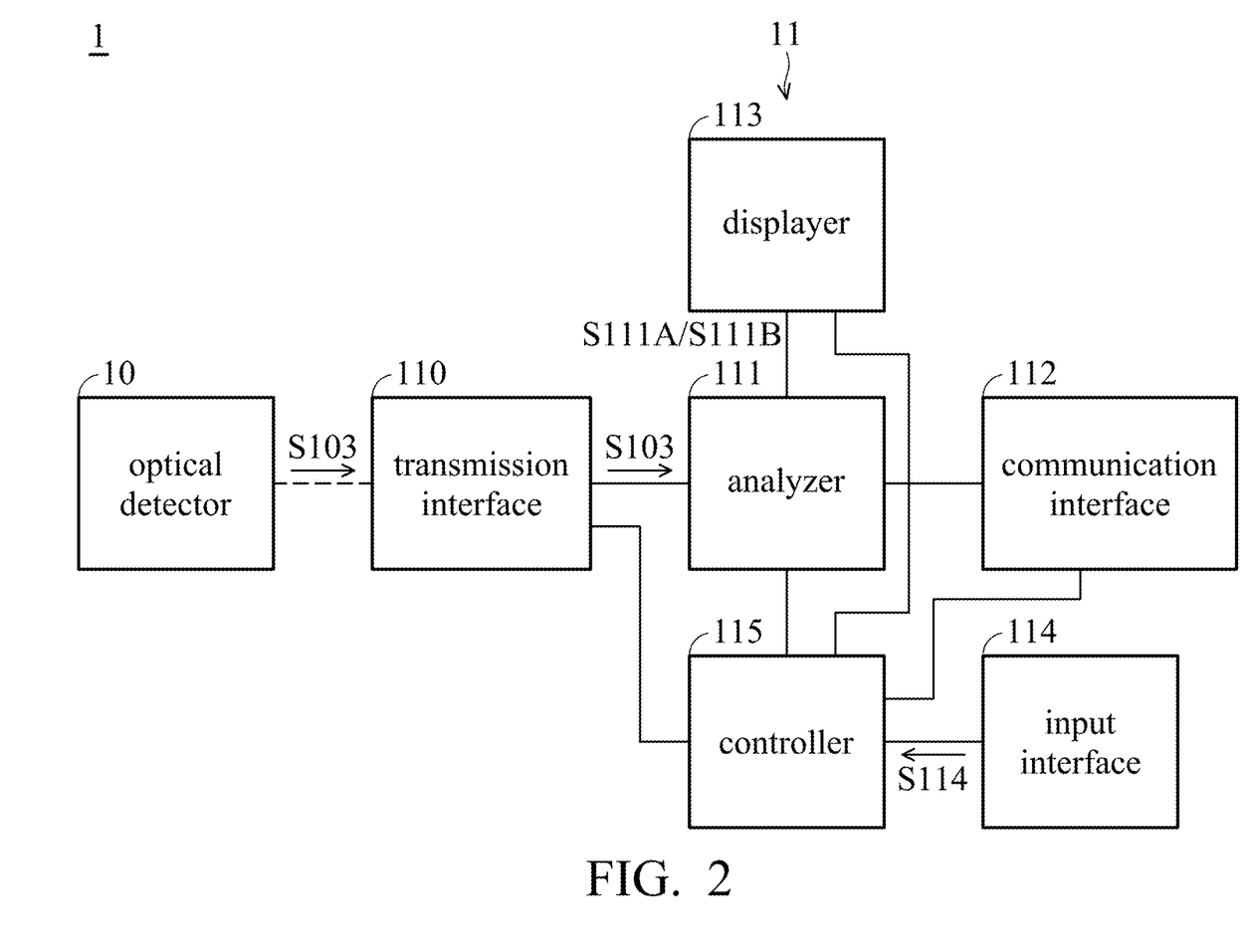
FIG. 2 is a block diagram of an examination system according to an exemplary embodiment of the present invention.

FIG. 1 is a schematic diagram showing appearance of an examination system according to an exemplary embodiment of the present invention. FIG. 2 is a block diagram of an examination system according to an exemplary embodiment of the present invention. Referring to FIGS. 1 and 2, an examination system 1 comprises an optical detector 10 and a host 11. The optical detector 10 can be communication to the host 11 by a wire or wireless connection. In the embodiment, the optical detector 10 is, for example, a hand-held detector. In other embodiments, the optical detector 10 can be a non-handheld detector. In FIG. 1, the appearance of the optical detector 10 and the host 11 is merely an exemplary example and is not intended to limit the present invention.

Bioluminescence fluorophores are present in human tissues. When tissues are irradiated by light in a specific wavelength range, the bioluminescence fluorophores are excited to emit auto-fluorescence. In general, angiogenesis is usually induced in abnormal tissues (for example, tumors). Since the absorption coefficient of the blood to the auto-fluorescence is higher, the ability of the abnormal tissues to absorb emitted auto-fluorescence is enhanced. In addition, the changes in the structure and arrangement of the cell substrate of the abnormal tissues or the epithelium thickening caused by the tissue lesions may weaken the intensity of the auto-fluorescence. Therefore, abnormal tissues and normal tissues can be distinguished by the difference in the auto-fluorescence characteristic between the abnormal tissues and the normal tissues. The examination system of the present invention utilizes the auto-fluorescence characteristic of tissues to determine the conditions of the tissues (for example, whether the tissues are in an abnormal state). In particular, the examination system 1 of the present invention is more suitable for examining abnormal tissues on the surface of the skin, for example, a tumor appearing in the oral cavity (oral cancer). Hereinafter, the present invention will explain the operation of the examination system 1 by taking an examination of the oral cancer as an example.

Figure 3:
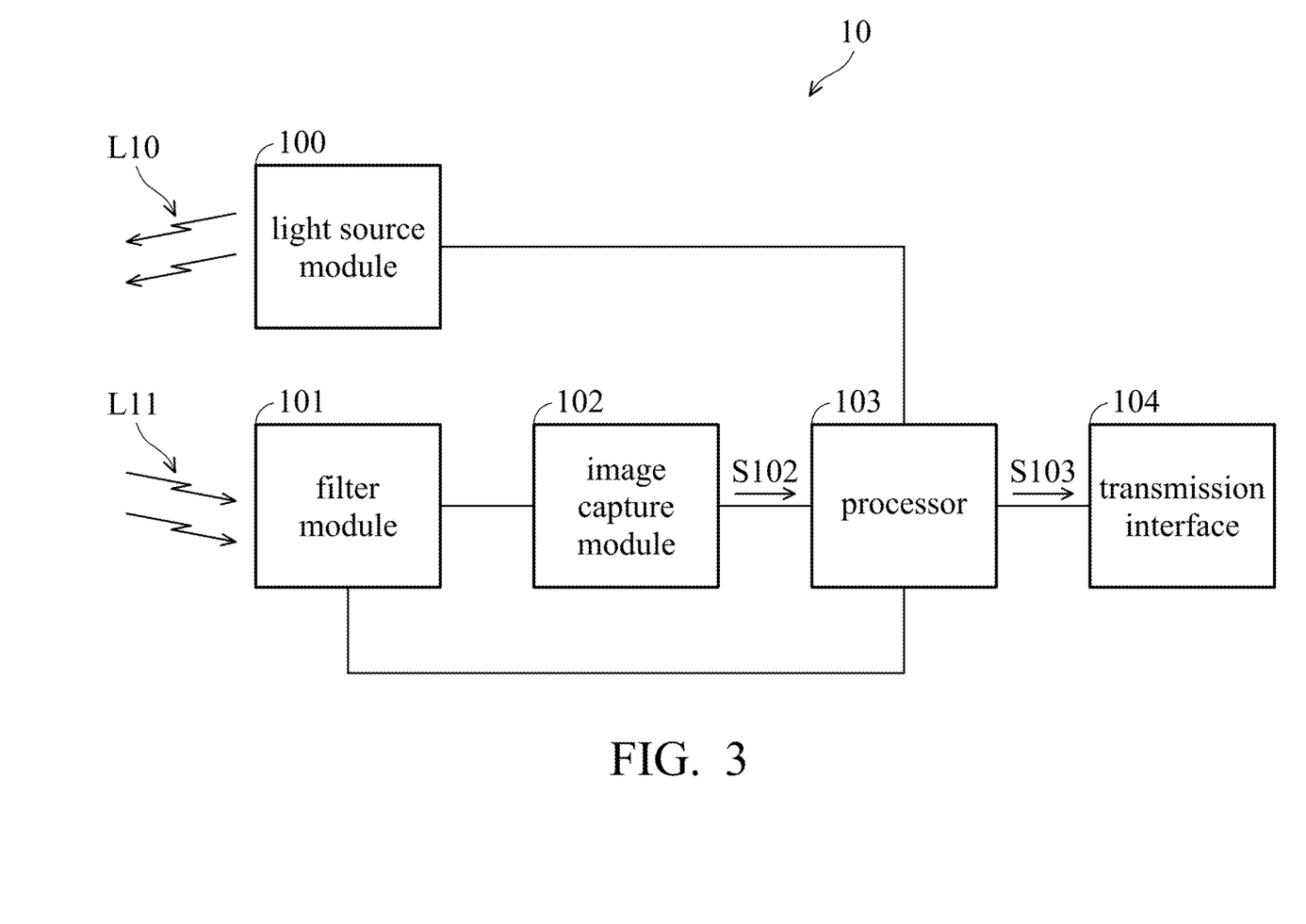
FIG. 3 is a schematic diagram showing components of an optical detector according to an exemplary embodiment of the present invention.

FIG. 3 is a schematic diagram showing the components of the optical detector 10 according to an exemplary embodiment of the present invention. Referring to FIG. 3, based on the operation functions and the signal/generation/transmission, the optical detector 10 comprises a light source module 100, a filter module 101, an image capture module 102, a processor 103, and a transmission interface 104. The actual configuration and structure of these elements can be designed according to requirements. The light source module 100 at least comprises a light excitation element. The light excitation element may emit a light source having a specific wavelength range, such as an ultraviolet light source having a wavelength ranging from 360 to 390 nm and/or a blue light source having a wavelength ranging from 440 to 460 nm. In a preferred embodiment, the light excitation element emits a blue light source having a wavelength in the range of 440 to 460 nm. The light source module 100 is controlled by the processor 103 to drive the light excitation element to emit a light source as the detection light source L10. In some embodiments, the light source module 100 can also comprise a white-light-emitting element that emits a natural light source, and the light source module 100 is controlled by the processor 103 to selectively drive the white-light-emitting element to emit a natural light source or drive the light excitation element to a light source as the detection light source L10. The light source module 100 emits the detection light source L10 toward a target object. In this embodiment, the target object is the oral cavity. When the oral cavity is irradiated with the white light source, the light source reflected by the oral cavity acts as the respondent light L11 and directly transmitted to the image capture module 102 without passing through the filter module 101. When the oral cavity is irradiated by a light source from the light excitation element, the oral tissues are excited by the light source to emit fluorescence. The fluorescence from the oral cavity acts as the respondent light L10, and the unnecessary components of the fluorescence is filtered through the filter module 101 while the light components having specific wavelengths remain. The respondent light L10 from the filter module 101 is then transmitted to the image capture module 102.

In this embodiment, the image capture module 102 may comprise charge-coupled devices (CCDs), complementary metal-oxide-semiconductor (CMOS) photosensitive elements, or other types of photosensitive elements. The photosensitive elements of the image capture module 102 converts the received respondent light into an electrical signal S102. The image capture module 102 transmits the electrical signal S102 to the processor 103. The electrical signal S102 is processed by the processor 103 to generate image data S103 to represent an image of a portion of the oral cavity that is irradiated by the detection light source L10 (hereinafter referred to as a detection image).

Referring to FIG. 3, the optical detector 10 can transmit signals, data, or instructions to the host 11 through the transmission interface 104. After the processor 103 obtains the image data S103, the optical detector 10 can transmit the image data S103 to the host 11 through the transmission interface 104. As shown in FIGS. 1 and 2, the host 11 comprises a transmission interface 110, an analyzer 111, a communication interface 112, a displayer 113, an input interface 114, and a controller 115. In FIG. 2, the arranged positions of the transmission interface 110, the analyzer 111, the communication interface 112, the displayer 113, and the input interface 114 on the host are given as an exemplary example, and are not intended to limit the present invention. The host 11 receives the image data S103 from the optical detector 10 through the transmission interface 110. In one embodiment, the transmission interface 104 of the optical detector 10 and the transmission interface 110 of the host 11 are wired transmission interfaces, such as connection ports. In this case, a connection line is required to connect the transmission interface 104 with the transmission interface 110. In another embodiment, the transmission interface 104 of the optical detector 10 and the transmission interface 110 of the host 11 are wireless transmission interfaces, for example, transceivers for wireless local area networks or Bluetooth. The controller 115 can transmit instructions or signals to the transmission interface 110, the analyzer 111, the communication interface 112, and the displayer 113. The input interface 114 serves as an input medium of the host 11 for a user (for example a medical professional), such as a mouse, a keyboard, a trackpad, a trackball, or a combination of at least two of the foregoing.

Figure 4:
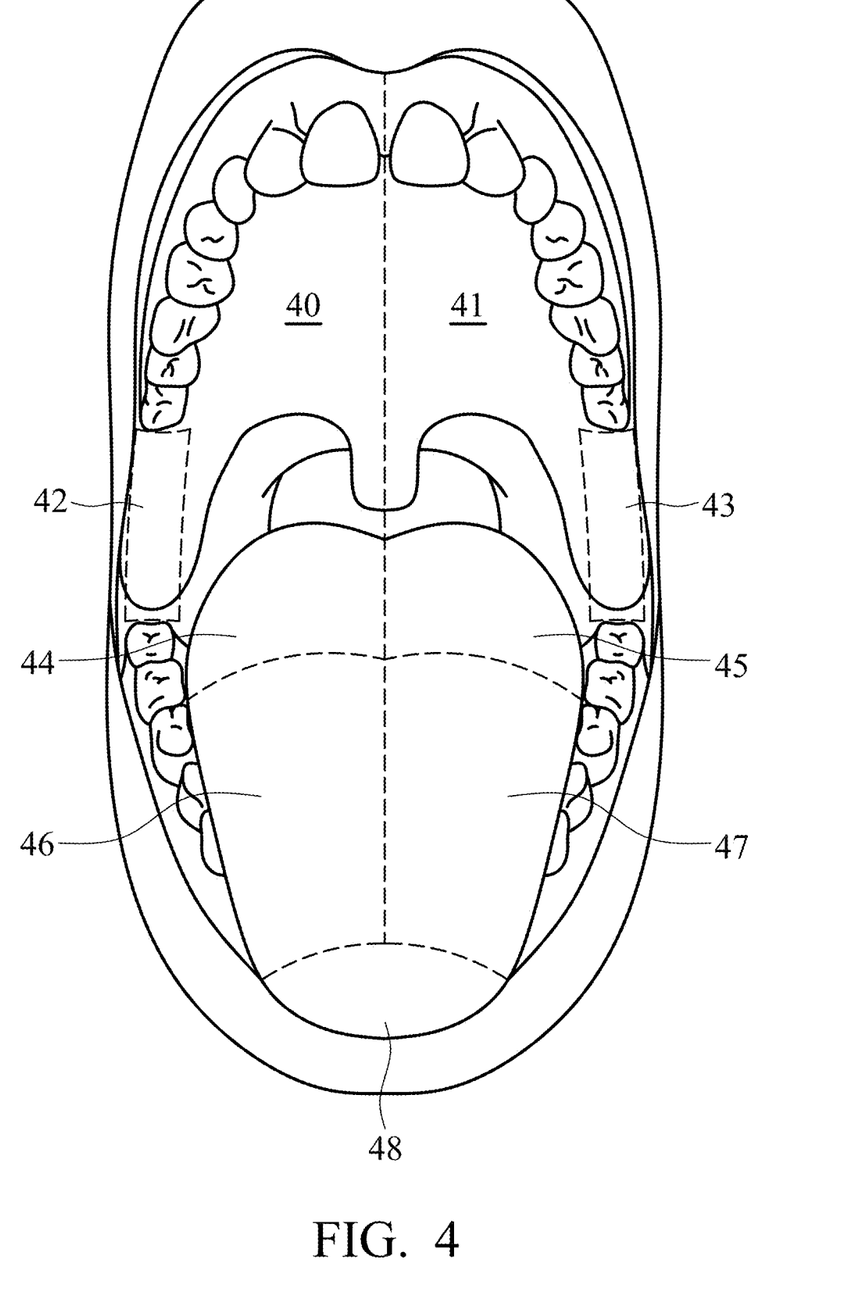
FIG. 4 is a schematic diagram showing an oral cavity divided into several regions according to an exemplary embodiment of the present invention.

In some embodiments, when the processor 103 generates the image data S103 according to the electrical signal S102, the processor 103 may provide a region tag to the image data S103 to indicate which region of the oral cavity the detection image represented by the image data S103 generated at this time belongs to. Therefore, the content of the region tag will vary with different regions of the oral cavity. Referring to FIG. 4, for example, the oral cavity 4 can be divided into nine regions 40-48. In an embodiment, the content of the region tag corresponding to one of the regions 40-48 is different from that the contents of the region tags corresponding to the other of the regions 40-48. In other embodiments, the region tags corresponding to at least two of the regions are the same, for example, the contents of the region tags corresponding the regions 44-47 are the same to indicate the region in which the tongue is located. The content of each region tag is decided by the processor 103. In detail, when the examination system 1 starts the examination operation, the processor 103 may sequentially provide the region tags having different contents to the image data S103, which is generated each time, in a predetermined order. For example, the region tags provided in the predetermined order are sequentially 40→41→ . . . →48. In another embodiment, the controller 115 sends a control instruction to the processor 103 through the transport interfaces 110 and 104 to specify a particular order for the region tags to the processor 103. When the examination system 1 starts the examination operation, the processor 103 may sequentially provide the region tags having different contents to the image data S103, which is generated each time, in the specific order indicated by the controller 115. In this embodiment, the user can transmit an instruction or signal S114 to the controller 115 through the input interface 114 to define the specific order, and then the controller 115 sends a control instruction to the processor 103 to control it to provide the region tags to the image data S103 in the specific order. In cases where the examination system 1 performs the examination operation and obtains only one record of image data S103, the processor 103 provides a region tag having a specific content to the image data S103. The processor 103 can decided the specific content, or the user can define the specific content by transmitting an instruction or signal S114 to the controller 115 through the input interface 114 and then sending a control instruction to the processor 103 to control it to provide the region tags to the image data S103 in the specific order. In other embodiments, when the processor 103 generates the image data S103 according to the electrical signal S102, the processor 103 may not provide any region tag to the image data.

Figure 5:
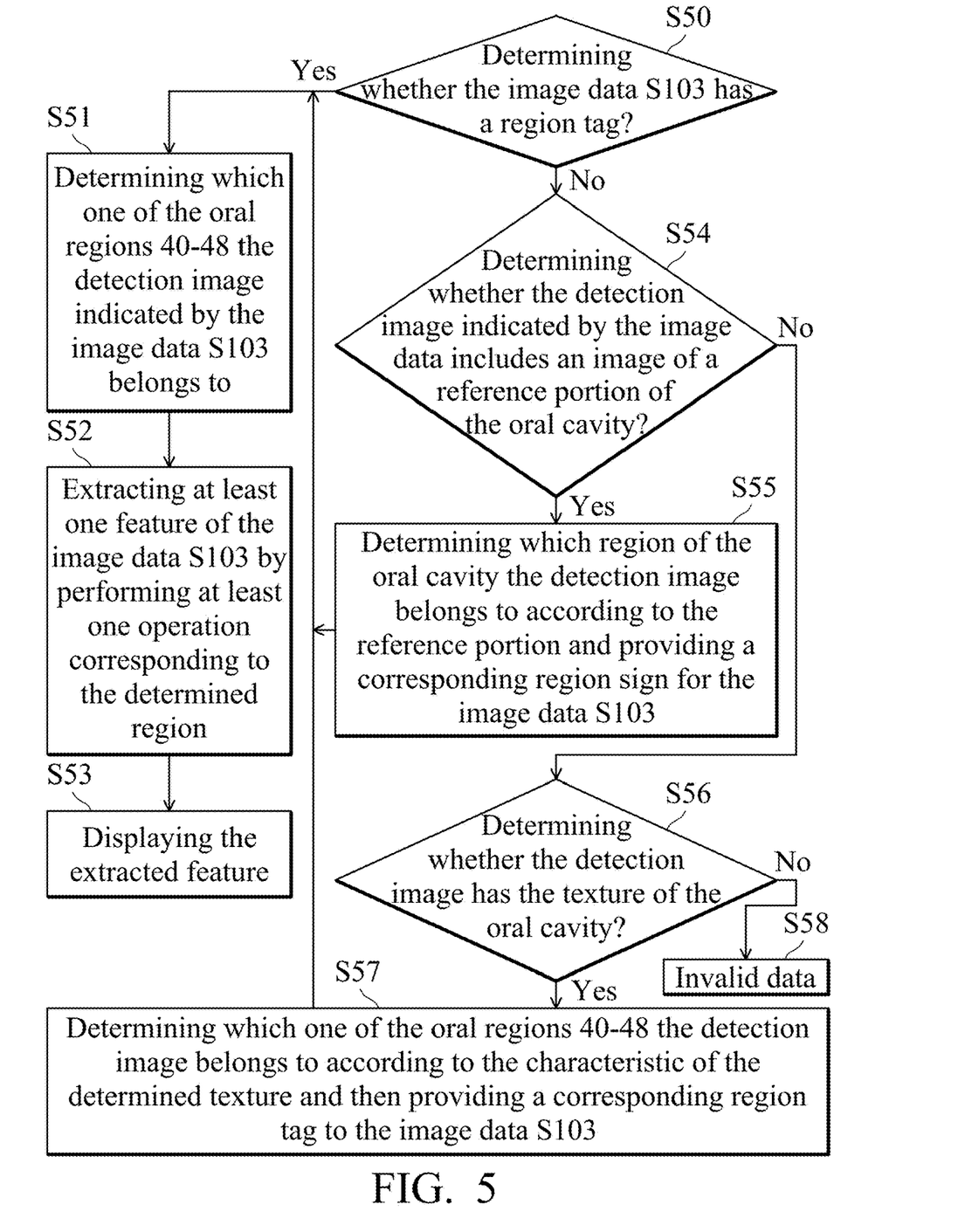
FIG. 5 shows an exemplary embodiment of an examination method.

FIG. 5 shows an exemplary embodiment of an examination method. The flow of the examination method will be described below with reference to FIGS. 2 and 5. When receiving the image data S103 from the optical detector 10, the transmission interface 110 transmits the image data S103 to the analyzer 111. The analyzer 111 determines whether the image data S103 has a region tag (step S50). When the analyzer 111 determines that the image data S103 has a region tag, the analyzer 111 then determines what the content of the region tag is, thereby determining which one of the oral regions 40-48 the detection image indicated by the image data S103 belongs to (step S51). For example, the analyzer 111 determines that the detection image is an image belonging to the region 43, and the following steps will be described below by this example. Next, the analyzer 111 performs at least one operation corresponding to the region 43 on the image data S103 to extract at least one feature of the image data S103 (step S52). In the following, an operation corresponding to the region 43 is performed on the image data S103 by the analyzer 111 to extract a feature of the image data S103 as an example. In one embodiment, the analyzer 111 comprises a memory that stores a plurality of predetermined operations. When the analyzer 111 determines that the detection image is an image belonging to the region 43, one operation is selected from the predetermined operations to extract one feature of the image data S103, such as area, probability, range, and the like. For example, the predetermined operations may include at least two of: calculating an average intensity of the grayscale values of the image data S103, calculating a heterogeneity or homogeneity between the grayscale values, calculating the contrast between the grayscale values, and calculating a correlation between the grayscale values.

When the feature of the image data S103 is extracted, the displayer 113 displays the feature extracted by the analyzer 111 (step S53). In an embodiment of the invention, the analyzer 111 comprises a classifier for classifying the extracted feature. For example, after the classification operation performed by the classifier, there may be two classification results, which respectively indicate that tissues of a specific region are abnormal and normal. That is, by classifying the feature, the classifier can classify a specific region (for example, the determined region 43) as a category of abnormal regions or a category of normal regions. In other embodiments, the analyzer 111 comprises a probabilistic classifier that performs the classification operation to determine the probability that the specific region belongs to an abnormal region or a normal region and then generate a corresponding classification result. Wherein the probability may be expressed as a percentage or a value. Depending on the setting of the examination system, the abnormal region can be replaced by a cancer region or a precancerous-sign region. In an embodiment, the analyzer 111 may represent the extracted feature as a value. The analyzer 111 generates a display signal S111A to the displayer 113 according to the above value and the classification result. Therefore, the display signal S111A includes not only the above value but also the information of the classification result. When the display 113 displays the above value, the value can be marked with different labels, such as different colors or symbols, according to the information of the classification result. In this way, when checking the feature value, the medical professional can determine whether the tissues in the specific region of the oral cavity is abnormal according to the value and the label of the value, thereby diagnosing whether a tumor or precancerous sign exists. In another embodiment, the analyzer 111 may generate a display signal S111B to the displayer 113 according to the image data S103 and the classification result. The display signal S111B includes not only the signal of the detection image but also the information of the classification result. When the displayer 113 displays the detection image, different colors, mark shapes, and color temperatures may be used to indicate the different degrees of the extracted feature. In this way, when checking the detection image displayed on the displayer 113, the medical professional can determine whether the tissues in the specific region of the oral cavity is abnormal according to the colors, mark shapes, and color temperatures, thereby diagnosing whether a tumor exists.

Figure 6:
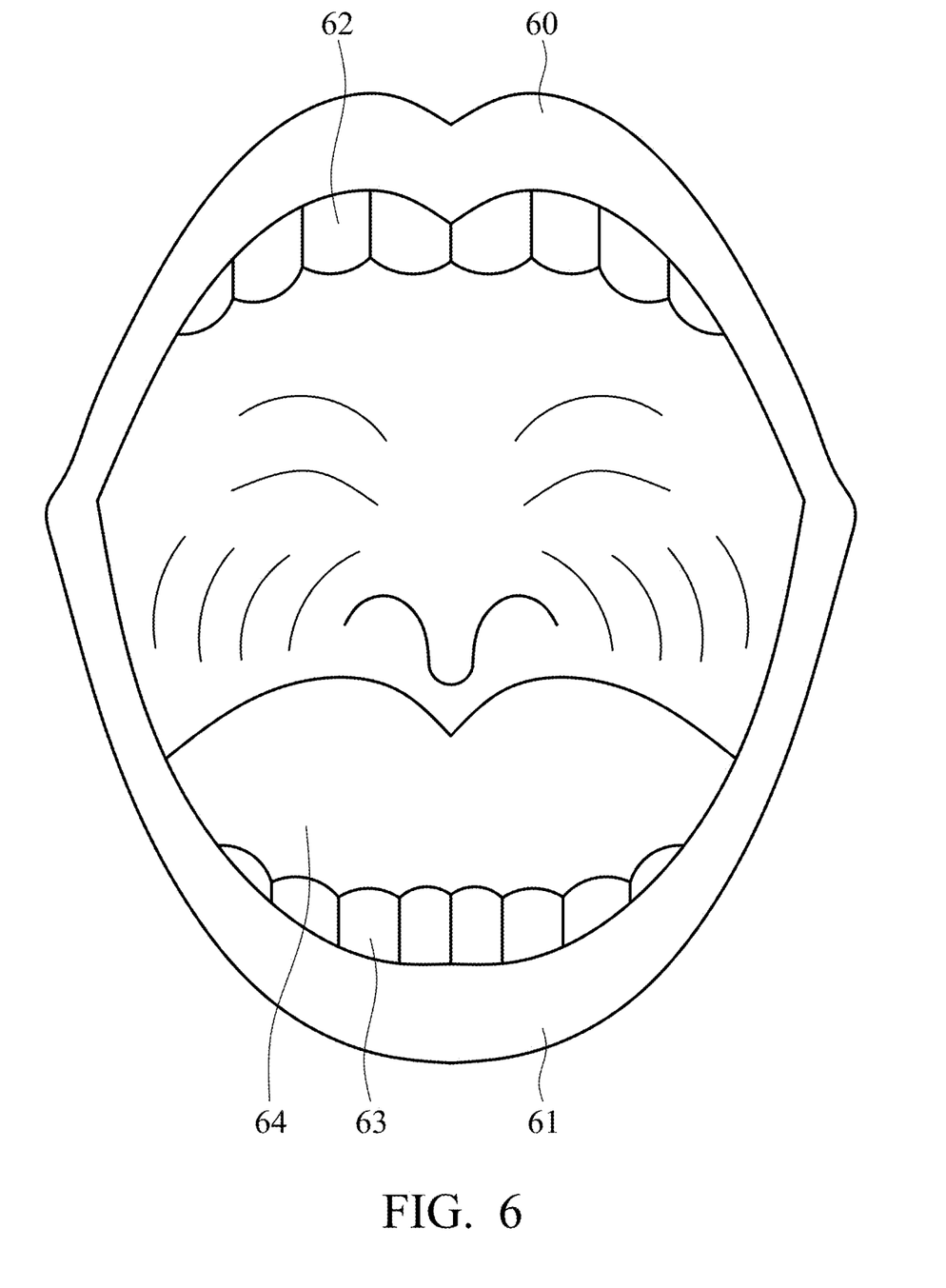
FIG. 6 is a schematic diagram showing positions of reference portions in an oral cavity.

When the analyzer 111 determines that the image data S103 does not have any region tag, the analyzer 111 determines whether the detection image indicated by the image data S103 includes an image of a reference portion of the oral cavity (step S54). In this embodiment, referring to FIG. 6, the reference portion is the upper lip 60, the lower lip 61, the upper teeth row 62, the lower teeth row 63, or the tongue 64. When determining that the detection image indicated by the image data S103 includes an image of a reference portion of the oral cavity, the analyzer 111 determines which region of the oral cavity the detection image belongs to according to the reference portion, and provides a corresponding region sign for the image data S103 (step S55). Then, the method proceeds to step S51.

When the analyzer 111 determines that the detection image indicated by the image data S103 does not include the image of any reference portion of the oral cavity, the analyzer 111 determines whether the detection image has the texture of the oral cavity according to the image data S103 (Step S56). Due to the surface texture characteristics of different regions in the oral cavity, when the analyzer 111 determines that the detection image has the texture of the oral cavity, it can determines which one of the oral regions 40-48 the detection image belongs to according to the characteristic of the determined texture and then provides a corresponding region tag to the image data S103 (step S57). Then, the method proceeds to step S51. When the analyzer 111 determines that the detection image does not have the texture of the oral cavity, it determines that the image data S103 is invalid (step S58). In this case, the analyzer 111 will not extract the feature of the image data S103. In the above embodiment, the image data S103 received by the analyzer 111, the extracted feature, the generated feature value, the generated display signal S111A/S111B, or a combination of at least two of the foregoing may be uploaded to an external memory device (for example, a cloud storage device) or another host through the communication interface 112.

Figure 7:
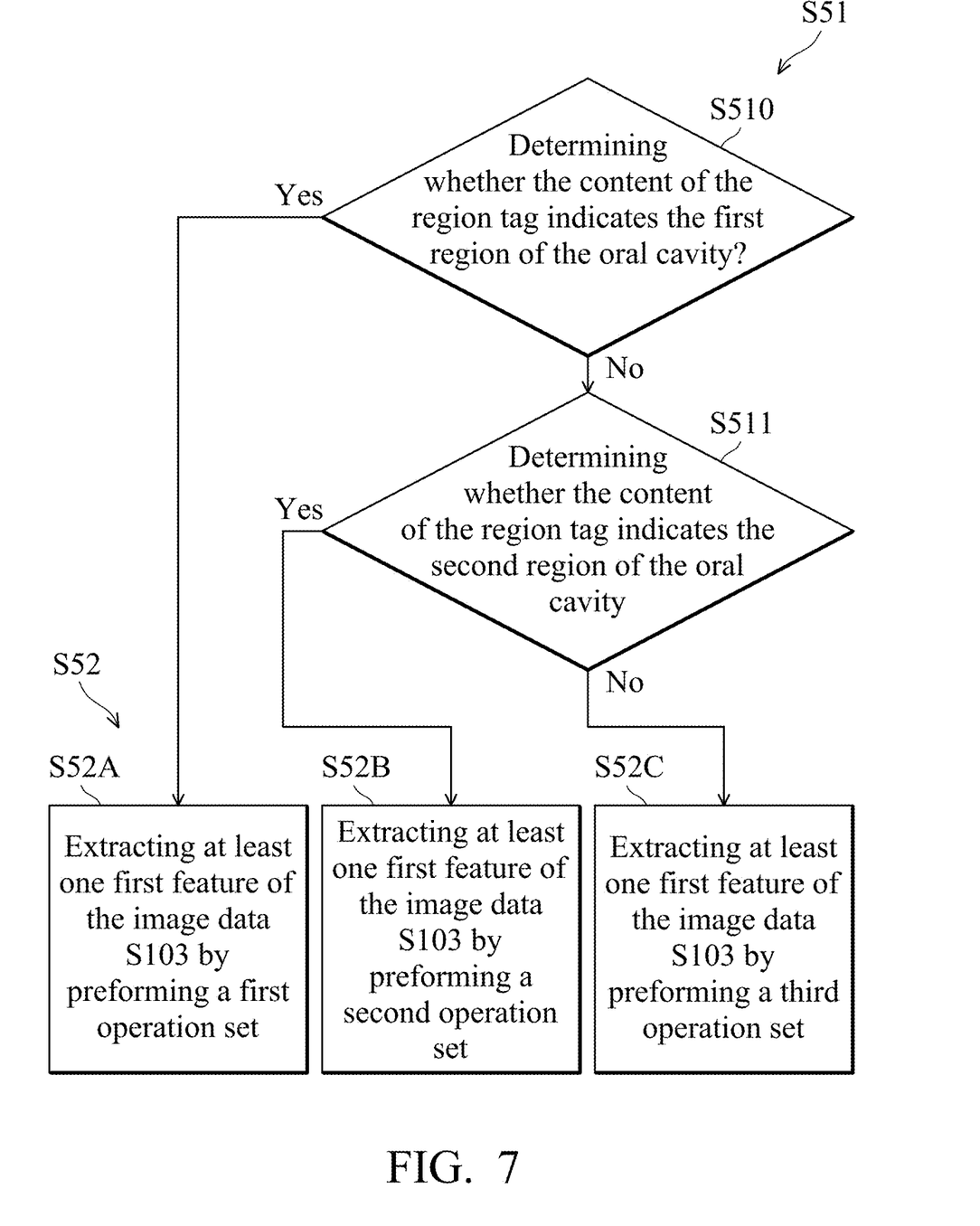
FIG. 7 is an exemplary embodiment showing a flow of a method for determining a content of a region tag and extracting at least one feature of an image data.

FIG. 7 is an exemplary embodiment showing the step S51 of determining what the content of the region tag is and the step S52 of extracting at least one feature of the image data S103. Referring to FIG. 7, when the analyzer 111 determines that the image data S103 has a region tag, the analyzer 111 first determines whether the content of the region tag indicates the first region of the oral cavity (step S510). In an embodiment, the first region is a cheek region, such as the region 42 and/or the region 43 shown in FIG. 4. When the analyzer 111 determines that the content of the region tag indicates the first region of the oral cavity, the analyzer 111 performs a first operation set corresponding to the first region on the image data S103 to extract at least one first feature of the image data S103 (Step S52A). When the analyzer 111 determines that the content of the region tag does not indicate the first region of the oral cavity, the analyzer 111 determines whether the content of the region tag indicates the second region of the oral cavity (step S511). In one embodiment, the second region is at least one of the regions 44-48 shown in FIG. 4, or the second region is a larger region which is formed by merging the regions 44-48. When the analyzer 111 determines that the content of the region tag indicates the second region of the oral cavity, the analyzer 111 performs a second operation set corresponding to the second region on the image data S103 to extract at least one second feature of the image data S103 (Step S52B). When the analyzer 111 determines that the content of the region tag does not indicate the second area of the oral cavity, the analyzer 111 determines that the content of the area mark indicates other regions of the oral cavity and performs a third operation set on the image data S103 to extract at least one third feature of the image data S103 (step S52C). In the embodiment of FIG. 7, the two steps S510 and S511 are taken as an example to determine the region indicated by the content of the region tag. In other embodiments, the analyzer 111 can complete step S51 by performing determination steps of content of more than two region tags. Furthermore, each of the first to third operational sets may include at least one operation, for example, calculating an average intensity of the grayscale values of the image data S103, calculating a heterogeneity or homogeneity between the grayscale values of the image data S103, calculating the contrast between the grayscale values of the image data S103, calculating the correlation between the grayscale values of the image data S103, and the energy of the local region spectrum of the image data S103 in different directions (for example, 30 degrees and 45 degrees), calculating spectrum energy of the image data S103 in a particular frequency band through the hierarchical image decomposition, or a combination of at least two of the foregoing.

Figure 8A:
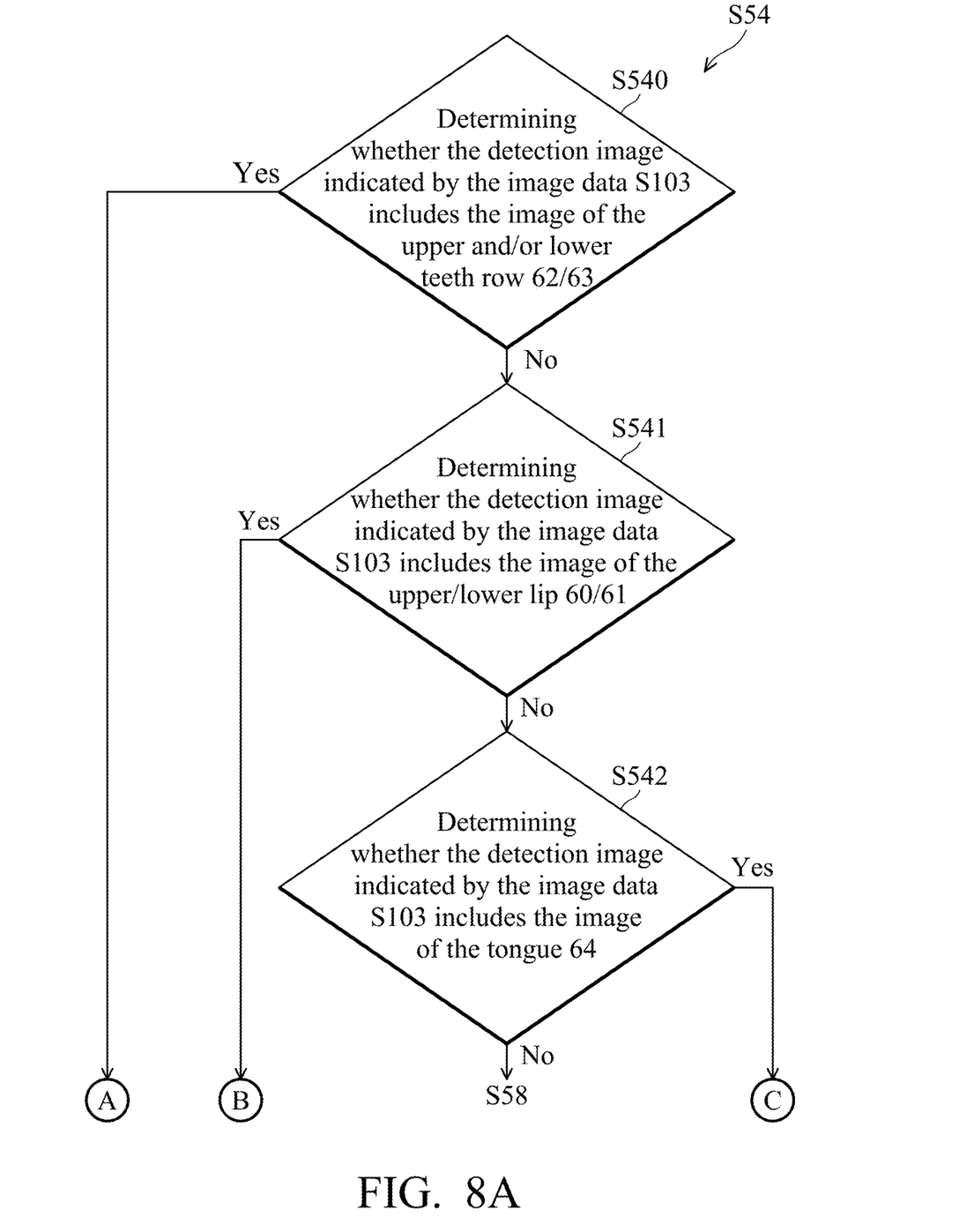
FIGS. 8A and 8B are an exemplary embodiment showing a flow of a method for determining whether a detection image includes an image of a reference portion of the oral cavity and providing a corresponding region sign for an image data.
Figure 8B:
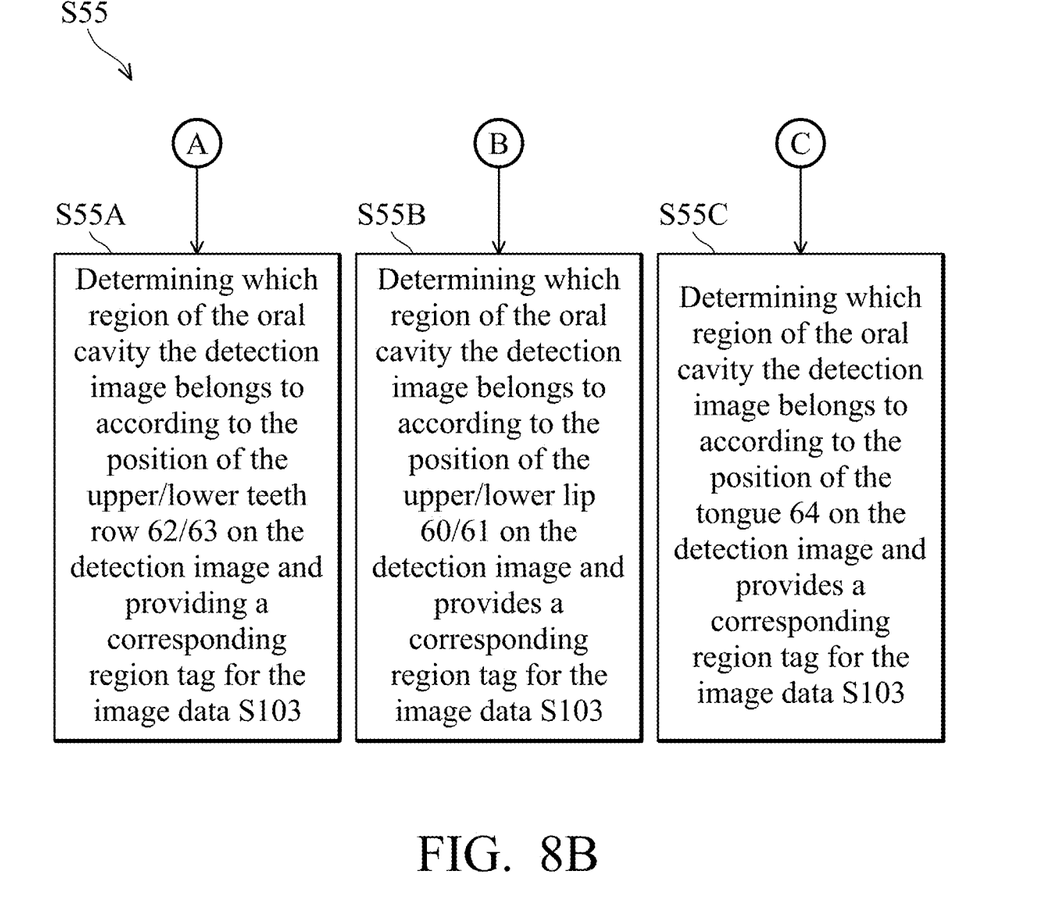

FIGS. 8A and 8B are an exemplary embodiment showing the step S54 of determining whether the detection image indicated by the image data S103 includes an image of a reference portion of the oral cavity and the step S52 of providing a corresponding region sign for the image data S103. When the analyzer 111 determines that the image data S103 does not have the region tag, the analyzer 111 first determines whether the detection image indicated by the image data S103 includes the image of the upper and/or lower teeth row 62/63 (step S540). When the analyzer 111 determines that the detection image includes the image of the upper/lower teeth row, the analyzer 111 determines which region of the oral cavity the detection image belongs to according to the position of the upper/lower teeth row 62/63 on the detection image and provides a corresponding region tag for the image data S103 (step S55A). When the analyzer 111 determines that the detection image indicated by the image data S103 does not include the image of the upper/lower teeth tow 62/63, the analyzer 111 determines whether the detection image indicated by the image data S103 includes the image of the upper/lower lip 60/61 (step S541). When the analyzer 111 determines that the detection image indicated by the image data S103 includes the image of the upper/lower lip, the analyzer 111 determines which region of the oral cavity the detection image belongs to according to the position of the upper/lower lip 60/61 on the detection image and provides a corresponding region tag for the image data S103 (step S55B). When the analyzer 111 determines that the detection image indicated by the image data S103 does not include the image of the upper/lower lip 60/61, the analyzer 111 determines whether the detection image indicated by the image data S103 includes the image of the tongue 64 (step S542). When the analyzer 111 determines that the detection image indicated by the image data S103 includes the image of the tongue 64, the analyzer 111 determines which region of the oral cavity the detection image belongs to according to the position of the tongue 64 on the detection image and provides a corresponding region tag for the image data S103 (step S55C). When the analyzer 111 determines that the detection image indicated by the image data S103 does not include the image of the tongue 64, the analyzer 111 determines that the detection image indicated by the image data S103 does not include images of any reference portion of the oral cavity, and the method proceeds to step S56.

In the above embodiment, the feature extracted by the analyzer 111, the generated feature value, the display signal S111A/S111B, and a combination of at least two of the foregoing may be uploaded to an external memory device (for example, a cloud storage device) or another host through the communication interface 112.

Figure 9:
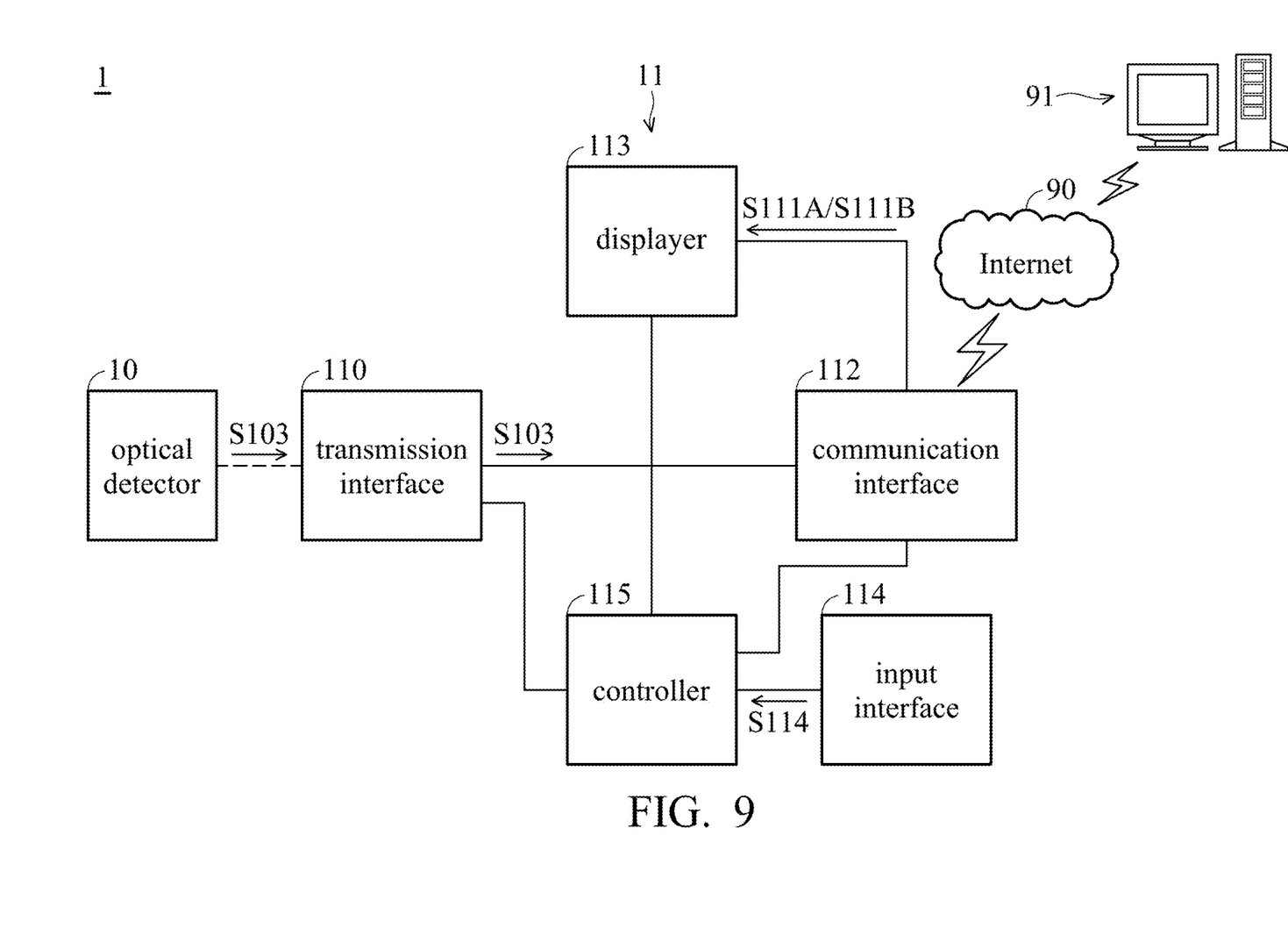
FIG. 9 is a schematic diagram showing appearance of an examination system according to another exemplary embodiment of the present invention.

In the above embodiment, the steps S50S52 of FIG. 5 are executed by the analyzer 111 in the host 11 based on the image data S103. In other embodiments, the steps S50-S52 of FIG. 5 are performed by a device that communicates with the host 11, such as a cloud device. As shown in FIG. 9, after the host 11 receives the image data S103, the image data S103 is transmitted to another host 91 through the communication interface 112 via the Internet 90. In this case, the host 91 acts as an analyzer to perform the steps S50-S52 and transmits the display signal S111A/S111B to the displayer 113 via the Internet 90 and the communication interface 112.

According to the various embodiments described above, the examination system of the present invention captures the image of the target tissues based on the auto-fluorescence characteristic of the human tissues and performs different operations on the image data according to the region where the target tissues are located to extract different features, which can improve the correlation between the features and the abnormal determination of the tissues. Thus, the medical professionals can correctly determine whether a tumor is induced on the target tissues according to the extracted features.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. An examination system comprising:
a detector emitting transmission light toward a target object and detecting a respondent light which is induced from the target object in response to the transmission light to generate image data, wherein the image data represents a detection image; and
a host receiving the image data and determining whether the detection image includes an image of a reference portion of the target object according to the image data,
wherein in response to determining that the detection image includes the image of the reference portion of the target object, the host is configured to determine which one region of the target object the detection image depicts according to the reference portion,
wherein when the host determines that the detection image depicts a specific region of the target object, the host is configured to extract at least one feature of the image data to serve as a basis for classification of the specific region,
wherein in response to determining that the detection image depicts the specific region of the target object, the host is configured to provide a region tag for the image data,
wherein the host is configured to select at least one of a plurality of predetermined operations according to a content of the region tag and is configured to extract the at least one feature of the image data according to the at least one predetermined operation selected by the host, and
wherein the image data includes a plurality of grayscale values of a plurality of pixels, and the host is configured to calculate a heterogeneity or homogeneity between the plurality of grayscale values.

2. The examination system as claimed in claim 1, wherein the target object is an oral cavity.

3. The examination system as claimed in claim 1, wherein the detector is configured to transmit the image data to the host by a wire or wireless connection.

4. The examination system as claimed in claim 1, the host is configured to calculate an average intensity of the plurality of grayscale values, the heterogeneity or homogeneity between the plurality of grayscale values, a contrast between the plurality of grayscale values, or a correlation between the plurality of grayscale values to serve as the at least one feature of the image data.

5. The examination system as claimed in claim 1, wherein the host is configured to classify the specific region as an abnormal region or a normal region according to the at least one feature of the image data, and the abnormal region is a cancer region or a precancerous-sign region.

6. The examination system as claimed in claim 1, wherein the host is configured to compute a probability that the specific region is classified as an abnormal region according to the at least one feature of the image data.

7. The examination system as claimed in claim 1, wherein the analyzer is further configured to:
determine whether the detection image have a texture of an oral cavity; and
in response to the detection image not having the texture of the oral cavity, not extract the at least one feature of the image data.

8. The examination system as claimed in claim 1, wherein the detector comprises:
a processor;
at least one light emitter controlled by the processor to emit the transmission light;
a filter module, wherein the respondent light from the target object passes through the filter module, and a light component having a specific wavelength remains in the respondent light, and
an image capture device receiving the respondent light passing through the filter module and converting the respondent light into an electrical signal,
wherein the processor is configured to generate the image data according to the electrical signal.

9. The examination system as claimed in claim 8, wherein the detector further comprises a white-light emitter, and the detector is controlled by the processor to emit the transmission light selectively by the at least one light emitter or the white-light emitter.

10. An examination method comprising:
emitting, by detector, a transmission light toward a target object;
generating, by detector, image data according to a respondent light which is induced from the target object in response to the transmission light, wherein the image data represents a detection image;
determining whether the detection image includes an image of a reference portion of the target object according to the image data;
in response to determining that the detection image includes the image of the reference portion of the target object, determining which one region of the target object the detection image depicts according to the reference portion;
extracting at least one feature of the image data in response to determining that the detection image depicts a specific region of the target object; and
taking the at least one feature of the image data as a basis for classification of the specific region,
wherein the step of extracting the at least one feature of the image data comprises:
in response to determining that the detection image depicts the specific region of the target object, providing a region tag for the image data;
selecting at least one of a plurality of predetermined operations according to a content of the region tag; and
extracting the at least one feature of the image data according to the at least one predetermined operation which is selected, wherein the image data includes a plurality of grayscale values of a plurality of pixels, wherein the step of extracting the at least one feature of the image data comprises calculating a heterogeneity or homogeneity between the plurality of grayscale values.

11. The examination method as claimed in claim 10, wherein the target object is an oral cavity.

12. The examination method as claimed in claim 10, wherein the step of emitting, by the detector, the transmission light toward the target object comprises:

emitting light having a specific wavelength, which serves as the transmission light, toward the target object.

13. The examination method as claimed in claim 10, wherein the step of emitting, by the detector, the transmission light toward the target object comprises:

selectively emitting a white light or light having a specific wavelength, which serves as the transmission light, toward the target object.

14. The examination method as claimed in claim 10, wherein the step of extracting the at least one feature of the image data further comprises:

calculating an average intensity of the plurality of grayscale values of the plurality of pixels, a contrast between the plurality of grayscale values, or a correlation between the plurality of grayscale values to serve as the at least one feature of the image data.

15. The examination method as claimed in claim 10, further comprising:

classifying the specific region as an abnormal region or a normal region, wherein the abnormal region is a cancer region or a precancerous-sign region.

16. The examination method as claimed in claim 10, further comprising performing following operations by the analyzer:

determining whether the detection image have a texture of an oral cavity; and in response to the detection image not having the texture of the oral cavity, not extracting the at least one feature of the image data.

* * * * *